Dec. 4, 1928.

N. J. TOCKAR

POLE PROTECTING DEVICE

Filed July 11, 1927

1,694,109

INVENTOR
NICHOLAS JOHN TOCKAR

BY Featherstonhaugh & Co

ATTORNEYS

Patented Dec. 4, 1928.

1,694,109

UNITED STATES PATENT OFFICE.

NICHOLAS JOHN TOCKAR, OF NORTH VANCOUVER, BRITISH COLUMBIA, CANADA, ASSIGNOR TO VIGGO LAURSEN, OF VANCOUVER, BRITISH COLUMBIA, CANADA.

POLE-PROTECTING DEVICE.

Application filed July 11, 1927. Serial No. 204,921.

My invention relates to improvements in pole protecting devices which are particularly adapted for use on wooden telegraph and other poles, fence posts and the like.

I have found that the rot usually suffered by a pole is greater adjacent the surface of the ground than it is at the lower extremity, and that the disintegration results particularly from a soil condition where humidity and dryness alternate. At the foot of a ploe I have usually found that the humidity of the soil is substantially constant and in consequence little or no rot appears.

The objects of the invention are to provide means whereby that portion of a pole which is embedded in the ground is prevented from rotting, such as usually occurs and which weakens the base of the pole and reduces its effective life, involving the replacement of the pole with its attendant expense.

The invention consists essentially of a wrapping of the base of the pole with a material capable of permitting a flow of air therethrough, an impervious covering for the wrapping, and means for preventing the seepage of rain or surface water about the covered portion of the pole base, as will be more fully shown in the accompanying drawings and described in the following specification, in which:—

In the drawings like characters of reference indicate corresponding parts in each figure.

Figure 2:
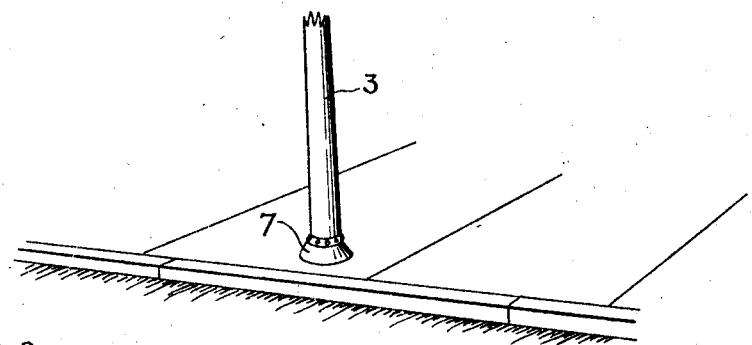
Fig. 2 is a general view of the invention as fitted to a pole erected in a sidewalk.
Figure 1:
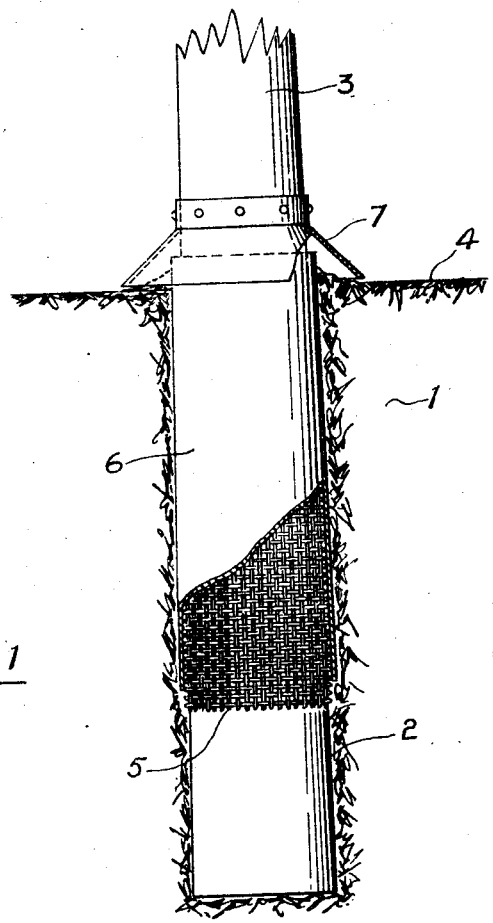
Fig. 1 is a sectional view of the ground showing the base of a pole therein and the invention applied thereto.

The numeral 1 indicates generally the ground into which a hole 2 is dug for the reception of a pole 3. If the pole is a large one requiring a relatively long embedded portion, I encircle its foot, from above the ground line 4 to a point above its lower extremity with a wrapping of heavy galvanized wire mesh 5 or other suitable material of an open texture. Surrounding the wrapping 5 is an impervious coating 6 such as galvanized iron or other like material against which the soil returned to the hole after the insertion of the pole is tamped.

The coating 6 is preferably carried up above the ground line 4 and slightly above the wrapping 5. Snugly fitted about the pole above the ground line and also above the coating 6 is a cone shaped flashing 7 which terminates slightly above the ground line 4 and serves to deliver rain water flowing down the pole at an appreciable distance therefrom, so that seepage in intimate contact with the base of the pole or the coating 6 is prevented.

It will be obvious that many modifications of the invention may be made such as providing a covering of corrugated or indented material, the corrugations or indentations of which would engage the pole and provide air circulating passages, such modifications being within the scope of the invention.

By providing an annular space between the flashing 7 and the ground line 4 air is permitted to pass freely around the base of the pole to stimulate an evaporation of moisture from below the ground level. The air may also circulate between the pole 3 and the impervious coating 6 through the interstices of the wrapping 5 so that a condition is produced whereby the foot of the pole is moist due to its direct contact with the ground, such moisture content being gradually reduced throughout that portion of the pole which is covered. This gradually diminishing moisture content is considered to remain substantially constant with the result that I have found poles so treated to be in perfectly good condition when others, not so equipped, but in exactly similar ground, were so rotted as to be dangerous and require replacement.

It will thus be seen that I have invented a pole protector which is extremely simple in form and in application, and which will greatly increase the effective life of the post to which it is fitted.

What I claim as my invention is:

1. Pole protecting means comprising a reticulate material wrapped around a portion of the pole that is to be embedded in the ground and an outer imperforate metal covering surrounding said reticulate material, the interstices of the reticulate material serving to permit circulation of air between the pole and the outer covering.

2. Pole protecting means comprising a wrapping of reticulate material covering a portion of the pole that is adapted to be embedded in the ground, an outer imperforate metal covering surrounding said wrapping, the interstices of the wrapping serving to permit circulation of air between the pole and the outer metal covering and an annular inclined shield secured to the pole and having its lower edge projecting below the upper end of said outer metal covering so as to prevent the entrance of rain between the pole and said outer covering while permitting the entrance of air.

Dated at Vancouver, B. C., this 22nd day of June, 1927.

NICHOLAS JOHN TOCKAR.